(No Model.) 6 Sheets—Sheet 1.

J. H. ELWARD.
HARVESTER.

No. 551,926. Patented Dec. 24, 1895.

Witnesses:
J. C. Turner
M. B. May

Inventor:
John H. Elward
by Doubleday & Bliss
Attys (No Model.) 6 Sheets—Sheet 2.

J. H. ELWARD.
HARVESTER.

No. 551,926. Patented Dec. 24, 1895.

Witnesses:
J C Turner
M B May

Inventor:
John H. Elward
by Doubleday & Bliss
attys

(No Model.) 6 Sheets—Sheet 3.

J. H. ELWARD.
HARVESTER.

No. 551,926. Patented Dec. 24, 1895.

Witnesses:
J. C. Turner
M. B. May

Inventor:
John H. Elward
by Doubleday & Bliss
Attys (No Model.) 6 Sheets—Sheet 4.
J. H. ELWARD.
HARVESTER.

No. 551,926. Patented Dec. 24, 1895.

Witnesses:
J. C. Turner
M. B. May

Inventor:
John H. Elward
by Doubleday & Bliss
Attys

(No Model.) 6 Sheets—Sheet 5.

J. H. ELWARD.
HARVESTER.

No. 551,926. Patented Dec. 24, 1895.

Witnesses
J. C. Turner
B. W. Sommers

Inventor
John H. Elward
by Doubleday & Bliss
Attorneys

(No Model.) 6 Sheets—Sheet 6.

J. H. ELWARD.
HARVESTER.

No. 551,926. Patented Dec. 24, 1895.

Witnesses:
J. C. Turner
On. B. Oney

Inventor:
John H. Elward
by Doubleday & Bliss
attys

UNITED STATES PATENT OFFICE.

JOHN H. ELWARD, OF WHITE WATER, WISCONSIN, ASSIGNOR OF ONE-HALF TO THE WINCHESTER & PARTRIDGE MANUFACTURING COMPANY, OF SAME PLACE.

HARVESTER.

SPECIFICATION forming part of Letters Patent No. 551,926, dated December 24, 1895.

Application filed December 23, 1887. Serial No. 258,847. (No model.)

*To all whom it may concern:*

Be it known that I, JOHN H. ELWARD, a citizen of the United States, residing at White Water, in the county of Walworth and State of Wisconsin, have invented certain new and useful Improvements in Harvesters, of which the following is a specification, reference being had therein to the accompanying drawings.

Fig. 2 is a side elevation from the gearing side. Fig. 11 is a top view of the other side bar of said frame. Fig. 12 is a cross-section of one of the coupling-sleeves that connects the side bar to the axle on line $z\ z$, Fig. 12$^a$. Fig. 12$^a$ is a section on the line $z'\ z'$, Fig. 12. Fig. 20 is a top plan view of the right-hand shoe and the parts connected thereto.

The main frame, as shown, consists of rear transverse cross-pieces B B', secured to the rear end of the tongue, and diagonal braces A' between the ends of the cross-pieces and the tongue at points in advance of the former. This framing referred to is made of bars of angle-iron or steel, more or less nearly L-shaped in section, one flange being arranged horizontally and the other vertically. Preferably I form the inclined braces A' and the rear cross-piece B in one and the same piece of angle-steel bent into substantially the conformation shown, the braces A' being turned parallel to the tongue at the front end, as shown at $b'$, for bolting thereto. At the rear corners the upper flange is cut or divided and one part overlaps the other and is riveted to it, so as to produce the proper bend and maintain sufficient strength.

Figures 5, 6, 7, 8:
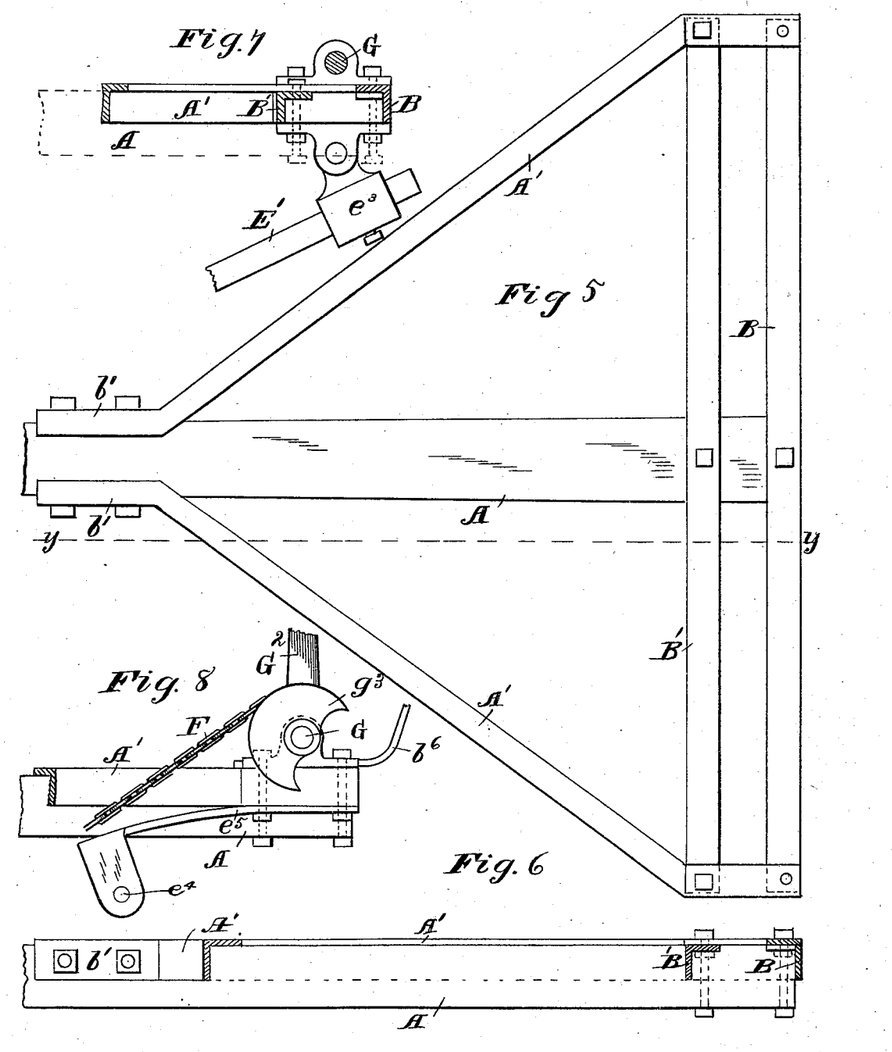
Fig. 5 is a top plan view of the rear end of the tongue and the angle-bar frame.
Fig. 6 is a section on line $y\ y$, Fig. 5.
Fig. 7 is a section on the line $y'\ y'$, Fig. 1, some of the parts being omitted.
Fig. 8 is an elevation on an enlarged scale of the parts at the right-hand end of the main frame.
Figure 9:
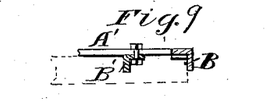
Fig. 9 shows a part of Fig. 6 on a smaller scale.
Figure 10:
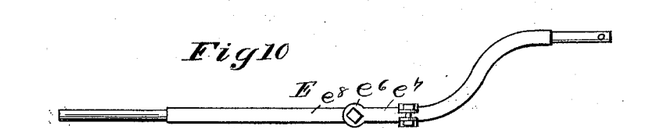
Fig. 10 is a top view of one of the side bars of the cutter-carrying frame.

The cross-piece B' is formed separately from those aforesaid and is secured in place as shown in Figs. 6 and 7, the horizontal flange being bolted to that of the part A' B.

The tongue A is carried back as far as the rear cross-piece B, it being recessed or grooved to receive the front cross-piece, as shown in Fig. 6—that is to say, more or less of the steel angle-bars are situated between the top and the bottom lines of the tongue, whereby firm union can be effected.

The axle is represented at D, upon which are the driving-wheels C C'. The latter are provided with a backing ratchet mechanism of any suitable kind, though, preferably, use is made of a form to be described.

The main frame and the draft devices are supported upon the axle by the following mechanism: E E' represent metal bars situated one at each side transversely to the axle and preferably below it. Upon the axle are mounted sleeve-sockets $e\ e'$, one for each side bar, the socket part $e$ receiving the side bar being preferably angular in section and transverse to the sleeve part $e'$, which part is fitted around the axle and held in place by a collar. These side bars E E' project to points in rear of the axle and are there passed through other socket-pieces $e^2\ e^3$. The bar E is sleeved in the socket-piece $e^2$ so that said bar can rock relatively thereto, there being pins or equivalent devices secured to the bar adjacent to the socket-piece to prevent movement endwise of the bar. This socket-piece is carried by an arm $e^5$, which projects forward from the above-described rear part of the main frame and to which it is bolted. The socket-piece is secured to the arm $e^5$ by a hinge $e^4$, so that the side bar E can have a rocking motion upon the hinge as an axis when necessary. At the other side of the machine the corresponding side bar E' has a socket-piece $e^2$, which is situated farther back than that at $e^3$, it being preferably below the cross-frame B B' and does not require an arm like that at $e^5$.

When the parts are arranged in the way just described, it will be seen that the line of the pivots which join the main frame or draft-frame with the bars E E' is inclined to the line of the pivots which join said bars to the axle.

Figure 1:
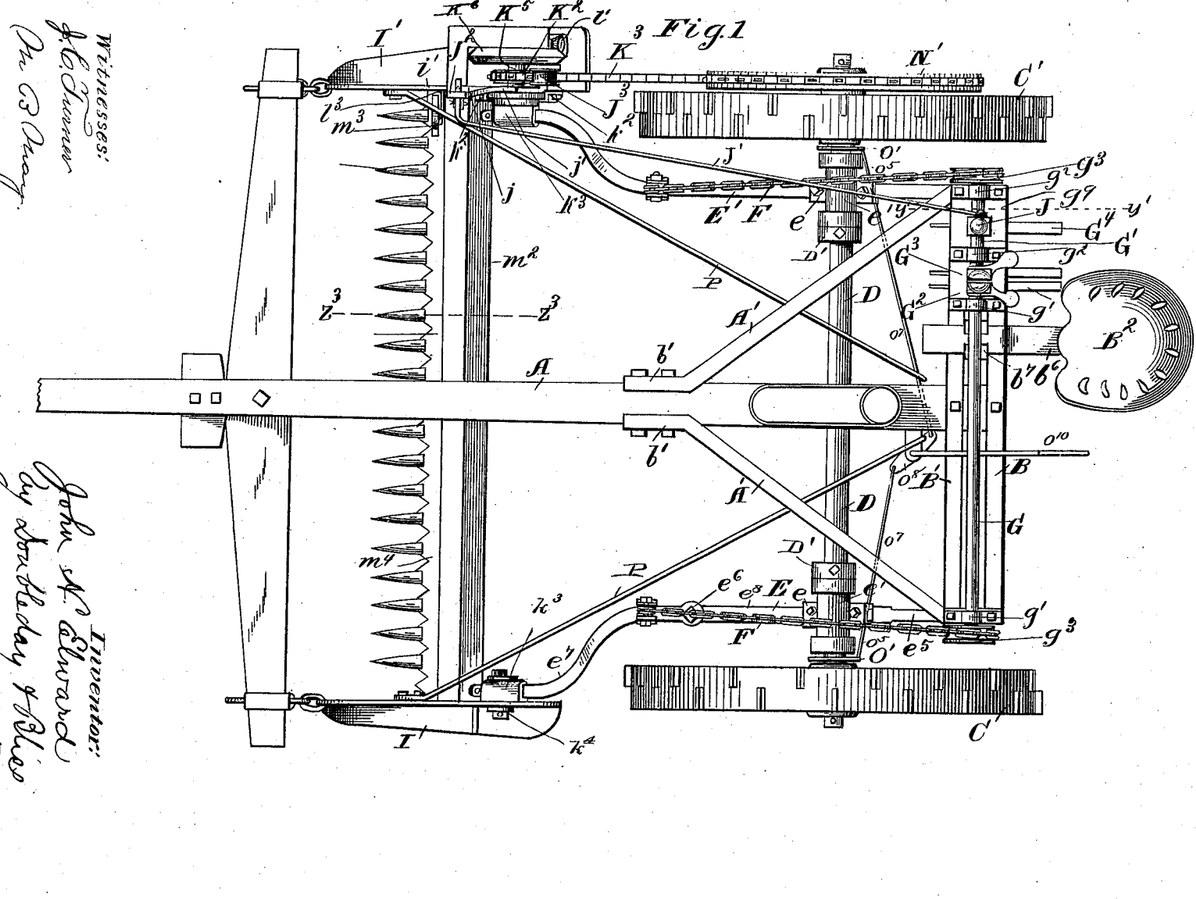
Figure 1 is a top plan view of a harvester embodying my improvements.
Figures 2, 11, 12, 12A, 20:
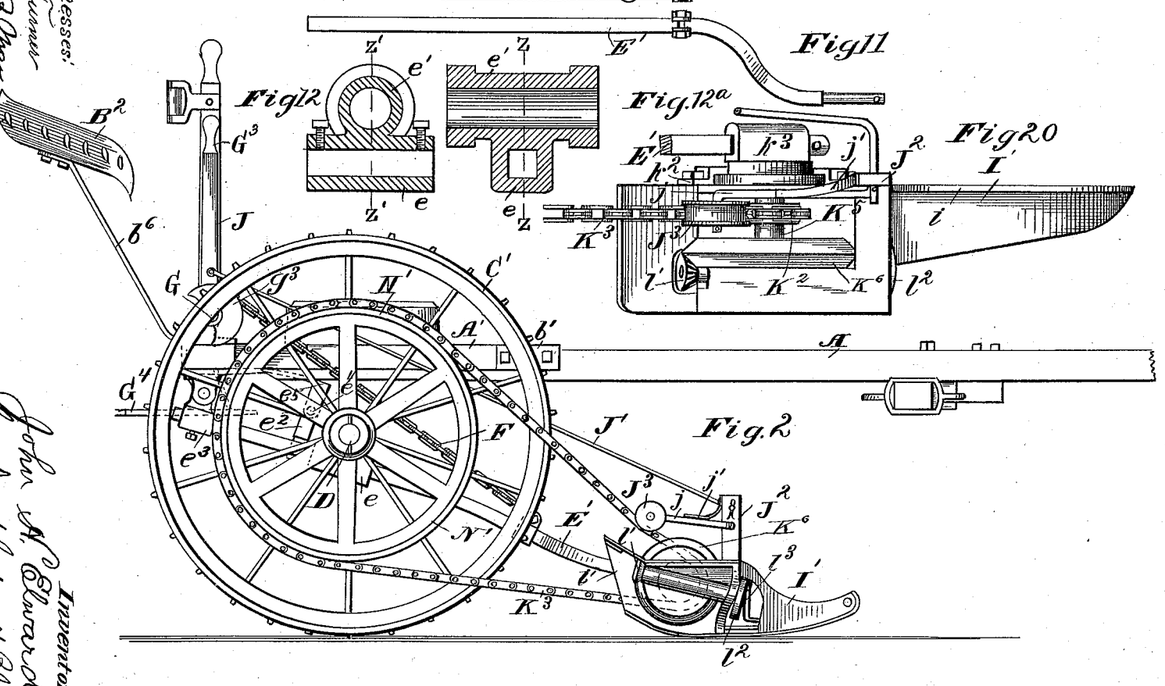
Figure 3:
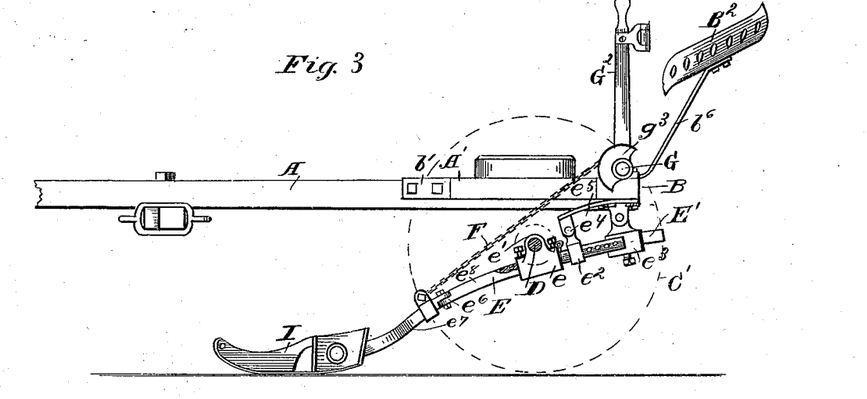
Fig. 3 is a side elevation of some of the parts from the opposite side.
Figure 4:
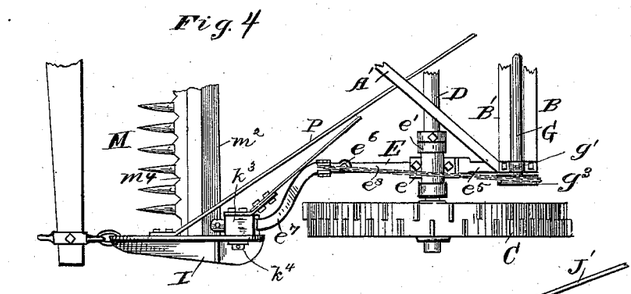
Fig. 4 is a top plan view of some of the parts at the left-hand side of the machine.

The side bar E is made in two parts longitudinally, they being hinged together at $e^6$, and indicated by the letters $e^7$ and $e^8$, as shown in Figs. 3 and 4. The other side bar E' is preferably made rigid from end to end, as shown in Fig. 11; but many of the purposes of the invention can be attained if it is also formed of parts jointed together. When the parts are thus constructed and arranged, it will be seen that the forward ends of the side bars E E' can be drawn up, inasmuch as they are loosely supported by the sleeve-sockets $e'$ on the axle and connected by hinges to the main frame. It will also be seen that by arranging the connection of the side bar E with the main frame at a point in advance of that where the connection of the side bar E' with the frame is made the leverage of the weight of the main frame, the pole and the driver, &c., will be greater on the right-hand side bar E' than it is on the left-hand side bar E, and one of the purposes aimed at by this is to apply a greater lifting or balancing power on that side of the machine which carries the cutter-driving gearing in order to preserve a uniformity of support of the cutter-bar throughout its length.

Another advantage gained by throwing forward the pivotal connection of the main frame with the side bar E is that a greater leverage from the weight of the driver and the rearward-projecting parts is brought to bear upon the forward-projecting parts of the draft devices so that weight upon the horse's neck can be adjusted closely to any desired extent. This becomes a matter of great advantage when the cutter-bar is elevated and secured to the tongue, as is the case when the machine is being transported from one point to another, at which time the weight of the forward part of the tongue would be greatly increased if a leverage of considerable power were not obtained in the way described.

By having a hinge at $e^6$ joining the parts of the side bar E, the shoe carried thereby and the adjacent end of the cutter-bar can be allowed to adapt themselves to all required positions.

Inasmuch as all of the parts are so arranged as to permit the cutter-carrying side bars to independently rise and fall, and also inasmuch as one or the other of these bars is being frequently purposely elevated by the driver, it is necessary that one or both of the shoes should be allowed to move inward toward the tongue somewhat when such elevation occurs to prevent cramping or binding. There is a tendency of the shoe connected to the side bar E and the adjacent end of the cutter-bar to approach the central longitudinal line of the machine, and this movement is allowed by having such a flexible connection as that shown at $e^6$ and described. The same end can be attained in numerous ways which will suggest themselves to those skilled in such devices.

In order to lift at any time either or both of the cutter-carrying side bars, use is made of the following devices: F F represent chains which at their ends are respectively secured to the side bars E E' at points suitably far forward of the axle and extending upward and backward to rock-shafts G G', which are mounted on the aforesaid main frame and transversely thereof. These shafts G G' are preferably in line with each other and are mounted in bearings at $g'$ $g^2$ supported on the main frame. At the outer end of each shaft there is a segment $g^3$ to which is connected one of the chains in a way well known, and as the segment is rocked by the shaft an upward lift is exerted on the cutter-carrying bars, as will be seen.

In order to elevate both the side bars E E' simultaneously or separately, I employ the following means: $G^2$ $G^3$ are lifting-levers, one secured to the inner end of shaft G and the other to the inner end of shaft G', and by means of them either side bar E or E' can be elevated or both can be elevated together. The levers $G^2$ $G^3$ are placed side by side and the handle portions thereof can be grasped together so that both levers can be rocked by one hand; or by means of the supplemental handles the driver can rock either at will, these handles projecting backward and outward in order to diverge sufficiently for ready grasping.

J represents the lever by which the tilting of the cutting mechanism is effected. It is loosely mounted on the shaft G', and can rock independently thereof. It is connected by a link J' with the parts which it operates. These three levers—namely, $G^2$, $G^3$ and J—are each held in place after adjustment by an improved ratchet-and-dog lock.

Referring to the levers $G^2$ $G^3$, it will be seen that each is at the lower end provided with teeth, as shown at $g^4$, the teeth of each lever being concentric with its shaft G or G'. $g^5$ $g^5$ represent dogs in the form of pins adapted to slide in guides $g^6$. These guides, as shown, are tubes cast with or secured to a plate $g^9$ secured to the frame. Each guide is slotted, as shown at $g^7$, and the dogs carry pins or projections $g^8$ fitting in said slots. The lower ends of the dogs $g^5$ pass through levers $G^4$, each having a cross pin or projection at $g^{10}$ below the lever, so that when the lever $G^4$ is pushed down it will draw the dog from the teeth at $g^4$. Each dog is held in place by a spring $g^{11}$ attached to the end of lever $G^4$ and to some stationary body, as the frame. The levers $G^4$ are pivoted on a rod $g^{12}$, which is carried by depending arms $g^{13}$ secured to the frame.

The levers $G^4$ extend backward far enough to have their rear ends in reach of the operator's foot. When he desires to let down one or both side bars E E', he first depresses one or both of the levers $G^4$ with his foot and then with his hand allows the levers $G^2$ $G^3$, one or both, to swing forward.

The lever J, as above-said, has a more or less similar locking mechanism attached, the latter differing, however, from that above described in that the teeth or sockets $g^{14}$ are square in side view with a correspondingly-shaped dog while those at $g^4$ are of the ordinary ratchet form.

The lever-locking mechanism of the kind just described is superior to the ordinary ratchet and dog generally employed in connection with such devices—that is to say, one with a convex-toothed rack adjacent to the lever, with a spring-dog, a link and a thumb-latch. It is necessary in a machine of the character described to have the parts of the cutter-carrying frame independently movable, and thus two levers are required. When these levers are placed close together, as is shown, it is difficult, if not ordinarily impossible, to operate the thumb-latches of both levers simultaneously; but by employing a foot-lever of the character described, the operator is enabled, at any moment, to grasp to advantage both levers at once. In respect to this part of the machine, also, there may be modifications without departing from the invention, so long as lever-locks be employed, and foot-levers be combined with said locks.

The side bars E E' support the cutting mechanism at their front ends.

The shoe I is secured to the cutter-carrying side bar E in the following way: $k^3$ is a socket or sleeve in which fits the part $e^7$ of the bar E. The socket $k^3$ has a lug or pivot $k^4$ on which the shoe I is pivoted, this pivot being in line with the pivot on the other shoe.

Figure 22:
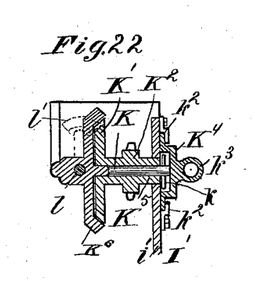
Fig. 22 is a section on the line $x^2\ x^2$, Fig. 21.

In Figs. 1, 2, 20, 21, and 22 a machine is shown in which use is made of a chain for carrying the power from the drive-wheel to the cutter-gearing. All of the parts connected with the shoe I' on the right-hand side of the machine are adapted to vibrate about the axis of the shaft $K^5$ which is driven by the chain. It is better to connect the parts in this way than to have the axis of the said shaft $K^5$ and the axis about which the cutting mechanism tilts on different lines. This making of these axes coincide with each other may be effected in any suitable way. In Fig. 22 I have shown a pivot-plate $K^4$ cast integral with a sleeve $k^3$, and arranged to have its axis of oscillation coincide with that of the shaft K. As it is desirable to have the shaft project somewhat through the wall $i'$ of the shoe, I form this pivot-plate $K^4$ with a chamber, the walls of which surround the projecting end of the shaft, so that the latter and its pin $k$ are not interfered with by the plate. The plate can be held in place in any way adapted to allow it to vibrate, as by means of clips $k^2$, secured to the wall $i'$ of the shoe, which center it and hold it to said wall. The sleeve $k^3$ receives the forward end of the side bar E', the latter being rounded where it lies in the sleeve, and shouldered above the rounded part, and provided with a pin below it.

It will be seen that there can be an oscillation of the shoe about the journal part of this bar E', as an axis—that is to say, a lateral oscillation—and there can be an oscillation of the shoe on the plate $K^4$ about a transverse axis, or an axis parallel with that of the main wheels, and coinciding with that of the chain-shaft. This axis also coincides as fully as possible with that of the sleeve connection at the left-hand side of the machine. In order to tilt the cutting mechanism to any desired angle, I connect the above-described lever J to the right-hand shoe by means of an upright bar $J^2$, which is bolted to the wall of the shoe or the finger-bar, either or both.

P P are upwardly and rearwardly extending grain-rods secured to the shoes I I' by bolts or otherwise, their free ends resting loosely upon the axle D.

The power-transmitting mechanism in Figs. 1, 2, 20, 21, and 22 consists of the chain $K^3$ engaging with the driving-wheel N', secured to the main axle D, and the smaller wheel $K^2$, which is mounted on the shoe, it being formed preferably in one piece with a sleeve $K^5$ and a bevel-wheel K'. These are supported on the shaft K, which is formed with or secured to the outer part of the shoe and projects through the aforesaid wall $i'$ thereof and is secured thereto by the pin $k$. The wheel K' engages with the bevel-wheel $l'$ on the crank-shaft $l$, and the crank-wheel $l^2$ is connected by the pitman $l^3$ with the cutter-bar. In order to protect the teeth of the bevel-wheel from being filled with dirt, I employ a shield or guard $K^6$, which covers it completely except at the place where the bevel-wheel meshes with the wheel $l'$.

In order to keep the driving-chain sufficiently taut, I employ a tightener $J^3$. As shown, it is pivotally connected to the above-described upright bar $J^2$ by means of an arm $j$, which extends backward from said bar and carries a small sheave which rests upon the chain. The weight of this may be depended on to take up the slack of the chain, or, if necessary, a spring, such as that shown at $j'$, may be arranged to bear on the arm $j$.

Figures 13, 14, 25:
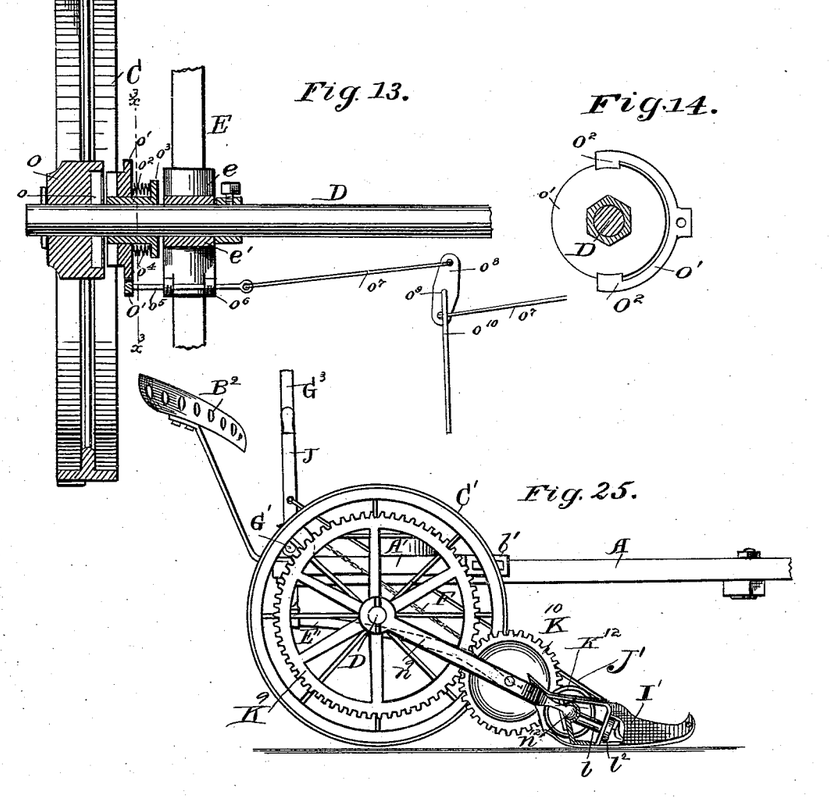
Fig. 13 is a horizontal section through the left-hand ground-wheel and the parts adjacent thereto.
Fig. 14 is a section on line $x^3\ x^3$, Fig. 13.
Figs. 25 and 26 are corresponding views of another modification.

In Figs. 13 and 14 I have shown my improved ratchet mechanism or clutch mechanism for backing the machine. The hubs O O of the wheels C C' are recessed at $o$, the face of the recess being radially grooved. On the axle D is rigidly secured a sleeve $o^2$ having a flange $o^3$, and on this sleeve by means of a feather and groove slides a collar $o'$ having a boss corresponding in size to the recessed portion $o$ of the hub O. The face of the boss is grooved so as to engage with the grooves in the hub, there being springs $o^4$ to insure engagement.

The mechanism is operated as follows: O' is a fork secured at $O^2 O^2$ to the sliding collar or clutch member $o^2$, and connected by links $o^5 o^7$ to a lever $o^8$ under and at one side of the tongue A, link $o^5$ being mounted in eyes $o^6$ on sleeve $e$. The lever is secured to one end of a rock-shaft $o^9$ mounted in bearings on the tongue and is bent to form a portion $o^{10}$ to be within reach of the operator's foot. It will be seen that when the foot-lever $o^{10}$ is moved, it rocks shaft $o^9$, thereby causing the links $o^5$ $o^7$ to disengage the movable clutch member $o'$ from the fixed member O, thus allowing the wheels C C' to rotate freely on the axle D.

Figures 15, 16, 17, 18, 19, 24:
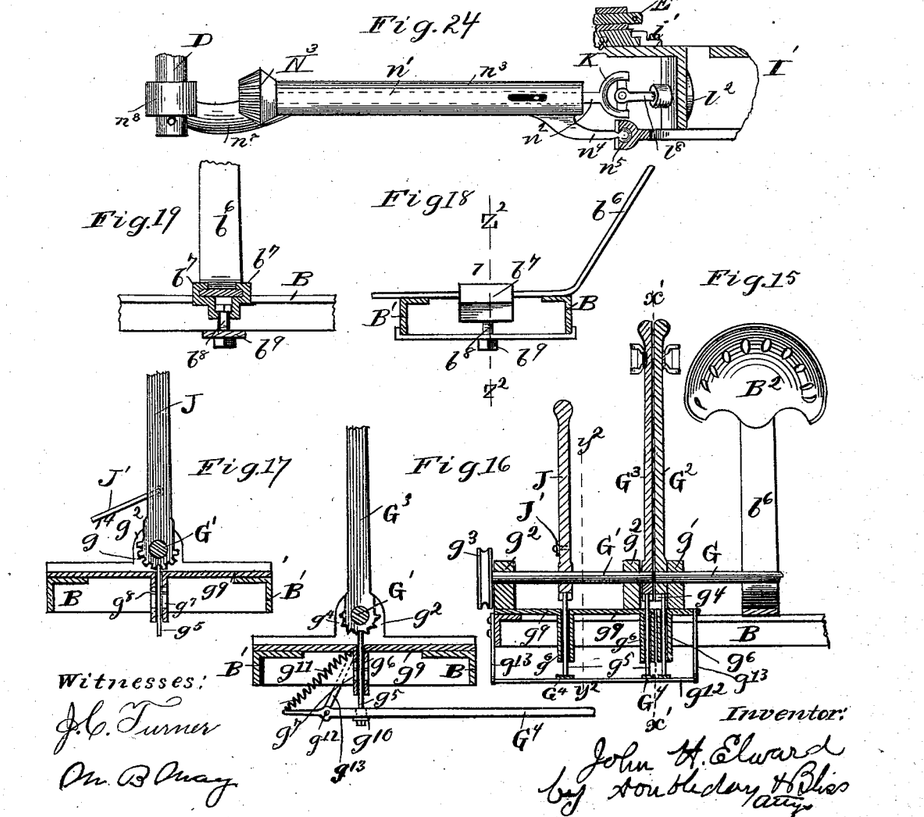
Fig. 15 is a section taken transversely of the frame at the right-hand side of the machine, showing the devices for elevating and tilting the cutting mechanism.
Fig. 16 is a cross-section on the line $x'\ x'$, Fig. 15.
Fig. 17 is a section on the line $y^2\ y^2$, Fig. 15.
Fig. 18 is a cross-section of the frame, showing the method of attaching the seat.
Fig. 19 is a section on the line $z^2\ z^2$, Fig. 18.
Fig. 24 is a top plan view of parts in Fig. 23.
Figure 21:
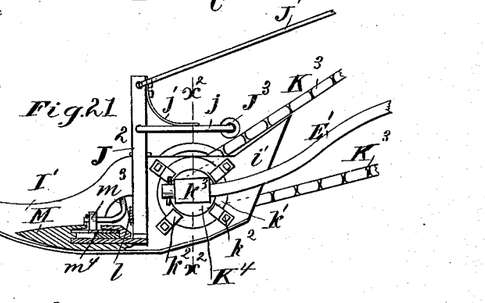
Fig. 21 is a partial section on the line $z^3\ z^3$, Fig. 1.
Figure 23:
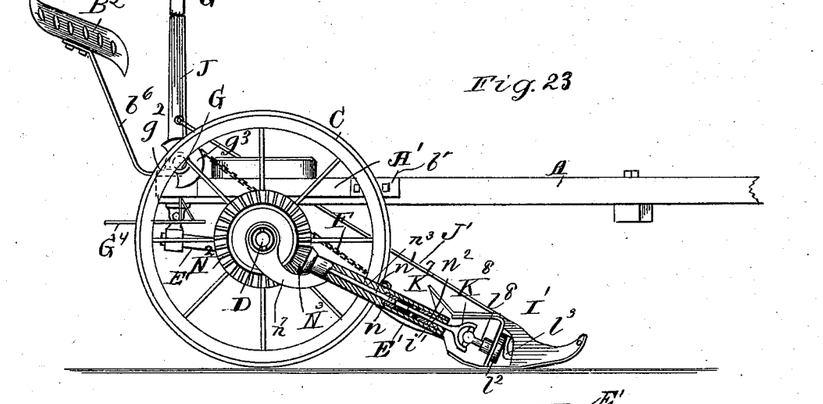
Fig. 23 is a side view of a modification of the machine.

In Figs. 23 and 24 I have shown a modification of the power-transmitting mechanism, the chain and chain-wheels being dispensed with, and a bevel-gearing being substituted therefor.

The main axle is provided with a bevel-wheel $N^2$, and this engages a bevel-pinion $N^3$. The shaft $K^7$ of this pinion extends down toward the crank-wheel and is supported in a sleeve or casting $n^3$, which is cast with the projecting arm $n^7$. This arm has a collar $n^8$, which is mounted on an extension of the axle D and which is held in place by a spring-pin, or in any other suitable way.

In order to have the transmitting mechanism adapted to the above-described movements of the cutting mechanism—namely, the vertical tilting of the cutters—the shaft is provided with a universal joint at $K^8$, the axis of which coincides with that of the sleeve connection at $k^3$, so that the parts $K^7 l^8$ of the shafting can assume the required angle relatively to each other without binding any of the driven parts. To effectually guard against any possible binding longitudinally of this pinion-shaft, I supplement this universal joint with a sleeve-joint for one of the parts of the shaft $K^7$. As shown, this comprises a sleeve $n$ secured to the upper part $n'$ of the shaft $K^7$, and an intermediate shaft-piece $n^2$, connected to the part $K^8$ of the universal joint, and extending into the sleeve $n$, with which it loosely engages by means of a pin fitted into a slot in the sleeve. The sleeve and intermediate shaft-piece $n^2$ can have endwise movement, if, under any circumstances, it should be demanded.

At the lower end the casting $n^3$ is shaped to provide a downward-extending arm $n^4$, which is united to the shoe I' or to an upward-projecting extension thereof by a ball-and-socket joint, as shown at $n^5$. The axis of this ball-and-socket joint coincides with that aforesaid, on which is arranged the sleeve connection at $k^3$ of the side bar E' with the shoe.

With mechanism of this character the transmitting devices can be firmly supported and yet that flexibility will be provided which will be required for permitting them to adapt themselves to any of several positions, as required when the parts of the cutting mechanism are tilted or varied in position from any cause.

Figure 26:
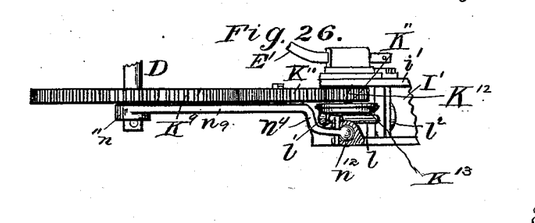

In Figs. 25 and 26 I have shown still another modification, in which straight gearing is employed instead of either a chain or bevel wheel. The main gear-wheel $K^9$ is secured to the axle D, and this engages with an intermediate or idler wheel $K^{10}$, which is mounted on an arm $n^9$, loosely supported on the end of the axle. This idler engages with a toothed wheel on the shaft $K^{11}$, the wheel $K^{12}$ taking the place of the chain-wheel in the construction above described. The rest of the construction is similar to that already described except that the bevel-wheel $K^{13}$ is fast to the axle of the pinion $K^{12}$. Here too the carrying-arm $n^9$ is joined to the shoe by a ball-and-socket joint on the axial line of shaft $K^{11}$. The arm $n^9$ has on one end a collar $n^{11}$, which is mounted on an extension of the axle D, while at the other end it has a ball $n^{12}$ fitting in a socket in the shoe I'.

The right-hand shoe and the last two described modifications are connected to the bar A by means of a sleeve and pivot-lug, as shown in Fig. 4.

The driver's seat $B^2$ is adjustably secured to the frame by the following devices: $b^6$ represents the spring-bar which supports the seat proper, it resting upon the angle-bars B B'. $b^7$ is a clamp which is slipped over this spring. $b^8$ is a bolt extending downward from the clamp and passing through a bar $b^9$, which rests against the under side of the bars B B'. When this bolt is fastened in place, the seat is secured in position. The latter can be adjusted to the right or left or forward or back by merely loosening the bolt $b^8$, and then sliding the seat into the desired position and then clamping it.

From the drawings and the above description it will be seen that I provide what may be regarded as a draft-frame and a cutter-carrying frame, and that as illustrated the draft-frame may be considered as being joined to the cutter-carrying frame by a main or intermediate frame. The draft-frame comprises the pole or tongue and the trees or other draft devices directly connected thereto. The intermediate or main frame comprises the parts at B B'. The cutter-carrying frame comprises the side bars E E' and the parts incident thereto for connecting them to the axle and to the other frames, and in respect of these parts there can be more or less variation without departing from the essential features of the invention.

What I claim is—

1. In a thrust cut harvester, the combination with an axle of a main frame extending behind the axle, and a cutter carrying frame extending forward from the axle, it having a vertical hinge at one side of said frame whereby one of the ends of the cutter bar can move toward and from the central vertical longitudinal plane of the machine, as described.

2. In a thrust cut harvester, the combination with the axle of a main frame adapted to extend behind the axle and rearward extending cutter carrying side bars pivotally connected to the axle and also pivotally connected to the main frame in rear of the axle the line of pivoting between the main frame and the cutter carrying side bars being inclined to the line of pivoting of the cutter carrying side bars to the axle, substantially as described.

3. In a thrust cut harvester, the combination with the axle, of the main frame extending to points behind the axle, the cutter carrying side bars pivotally connected to the axle and also pivotally connected to the main frame by two hinges, one hinge on each side of the machine and one being situated nearer the axle than the other and both situated behind the axle, substantially as set forth.

4. In a thrust cut harvester, the combination with the axle of the main frame extended to points behind the axle, the cutter carrying frame having two bars one at each side of the machine, both of said bars being pivotally connected to the axle and also pivotally connected to the main frame at points behind the axle and one of said bars being formed in two parts united by a vertical pivot in front of the axle, substantially as set forth.

5. In a thrust cut harvester, the combination of the main frame extended back of the axle, the cutter carrying bars E E', the bar E being pivotally connected to the axle and to the main frame, it being formed in two parts united by a vertical pivot in front of the axle and being pivotally connected to the shoe, substantially as set forth.

6. In a thrust cut harvester, the combination with the axle of the main frame extended behind the axle, the cutter carrying frame having a side bar E pivotally connected to the axle and to the main frame and formed in two parts, joined together by a pivot in front of the axle and a mechanism for elevating the cutter carrying frame attached thereto at a point in front of the said vertical pivot, substantially as described.

7. In a thrust cut harvester, the combination with the axle and the main frame extended behind the axle, of the cutter carrying side bars both pivotally connected to the axle and both connected to the main frame by pivots transverse to the machine and one or both pivotally connected to the main frame on an axis longitudinal of the machine, substantially as set forth.

8. In a thrust cut harvester, the combination with the axle and the main frame extended back of the axle, of the cutter carrying side bars pivotally connected to the axle around a horizontal axis extended to the rear and joined to the main frame in rear of the axle and one or both having a pivotal axis of connection with the main frame transverse to the aforesaid axis, substantially as described.

9. In a thrust cut harvester, the combination with the axle and the main frame of the cutter carrying side bars E E' extended in rear of the axle and connected there to the main frame and to the axle, side bar E being divided into two parts at a point in front of the axle, said two parts being vertically pivotally connected, substantially as described.

10. In a thrust cut harvester, the combination with the axle and the main frame extended behind the axle, of the rearwardly extending cutter carrying side bars E, E', said bar E being pivotally connected with the axle and connected with the main frame in rear of the axle by a hinged connection having two axes, one axis transverse to the other, substantially as described.

11. The combination with the axle and the main frame extended behind the axle of the cutter carrying side bars E E', said bar E being formed in two parts vertically hinged together in front of the axle, one of said parts being pivotally connected to the axle and united to the main frame in rear of the axle by a hinge connection having two axes, one axis being transverse to the other, substantially as set forth.

12. In a thrust cut harvester, the combination of the cutter carrying side bars projecting forward from the axle, the cutting apparatus united by two hinges to the said cutter carrying side bars and the cutter driving gearing having the axis of oscillation coinciding with the axis of said hinges, substantially as set forth.

13. In a thrust cut harvester, the combination with the axle and the main frame, of the cutter carrying side bars projecting forward from the axle, the shoes, the cutter driving gearing mounted on one of the shoes, the power transmitting devices interposed between those aforesaid and the main axle and adapted to oscillate about an axis transverse of the machine and extending through or across the shoe, and the hinges which unite the cutter carrying side bars with the cutting apparatus, substantially as set forth.

14. In a thrust cut harvester, the combination with the axle, and the main frame, of the cutter carrying side bars projecting forward from the axle, the shoes, the cutting mechanism, the hinged connection between the shoes and the cutter carrying side bars, the tilting lever on the frame connected to the shoes in front of or above the said hinge connection, and means for locking said lever, substantially as described.

15. In a thrust cut harvester, the combination with the axle, the main frame, the cutter carrying side bars and the shoes, of the cutting mechanism, the tilting lever, the cutter driving chain and an automatic chain tightener for the chain, substantially as set forth.

16. The combination with the main frame, the axle, and the cutter carrying frame formed in two independently vertically adjustable parts, of the separate lifting shafts, the separate lifting levers having their handle portions adjacent to each other and the separate locks for said levers, substantially as set forth.

17. The combination with the axle and the frame of the two independently pivoted cutter carrying side bars, of the two separate and independent lifting levers mounted in the frame, the locks of said levers, and the independent foot levers whereby one or both of said locks can be released by the operator's foot, substantially as set forth.

In testimony whereof I affix my signature in presence of two witnesses.

JOHN H. ELWARD.

Witnesses:
THOS. E. WOODS,
ISAAC JIMERSON.